United States Patent
Neuerburg

(12) 
(10) Patent No.: US 6,393,811 B2
(45) Date of Patent: May 28, 2002

(54) CUTTING ELEMENT FOR A ROTARY CUTTING MACHINE

(75) Inventor: Horst Neuerburg, Saverne (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 09/732,298

(22) Filed: Dec. 8, 2000

(30) Foreign Application Priority Data

Dec. 23, 1999 (FR) .............................................. 99 16870

(51) Int. Cl.[7] .............................................. A01D 34/76
(52) U.S. Cl. .............................................. 56/6; 56/255
(58) Field of Search .............................. 30/276; 56/255, 56/295, 12.1, 12.7, 17.5, 6, 7

(56) References Cited

U.S. PATENT DOCUMENTS

| | | |
|---|---|---|
| 3,755,999 A | 9/1973 | Meyer et al. |
| 4,343,138 A | 8/1982 | Neuerburg |
| 4,426,828 A | 1/1984 | Neuerburg |
| 4,443,998 A | 4/1984 | Neuerburg |
| 4,452,034 A | 6/1984 | Neuerburg |
| 4,765,127 A | 8/1988 | Hamblen |
| 4,809,488 A | 3/1989 | Neuerburg et al. |
| 4,879,870 A | 11/1989 | Neuerburg |
| 4,896,493 A | 1/1990 | Neuerburg |
| 4,922,693 A | 5/1990 | Neuerburg |
| 4,970,848 A | 11/1990 | Neuerburg et al. |
| 4,999,981 A | 3/1991 | Neuerburg |
| 5,241,809 A | 9/1993 | Wolff et al. |
| 5,566,537 A | 10/1996 | Kieffer et al. |
| 5,660,032 A | 8/1997 | Neuerburg et al. |
| 5,711,141 A * | 1/1998 | Pitman et al. ................ 56/255 |
| 5,727,371 A | 3/1998 | Kieffer et al. |
| 5,852,921 A | 12/1998 | Neuerburg et al. |
| 5,896,733 A | 4/1999 | Neuerburg et al. |
| 5,934,050 A | 8/1999 | Neuerburg et al. |
| 5,966,913 A | 10/1999 | Neuerburg |
| 6,128,892 A | 10/2000 | Neuerburg et al. |

FOREIGN PATENT DOCUMENTS

| | | |
|---|---|---|
| AU | 418 830 | 11/1971 |
| DE | 41 27 581 | 2/1993 |
| FR | 2 774 853 | 8/1999 |
| WO | WO 98/20727 | 5/1998 |

* cited by examiner

Primary Examiner—Robert E. Pezzuto
(74) Attorney, Agent, or Firm—Oblon, Spivak, McClelland, Maier & Neustadt, P.C.

(57) ABSTRACT

A cutting element for a rotary cutting machine comprising several adjacent cutting members each of which is intended, during work, to rotate about an upwardly directed respective axis. The cutting element comprises an active zone intended to cut plants and a connecting zone intended to connect the cutting element to a support of a respective one of the cutting members of the cutting machine. The connecting zone has, in cross section, a relatively flat central part, a first edge inclined toward one side of a plane of extension of the central part, and a second edge inclined toward the other side of the plane of extension.

14 Claims, 4 Drawing Sheets

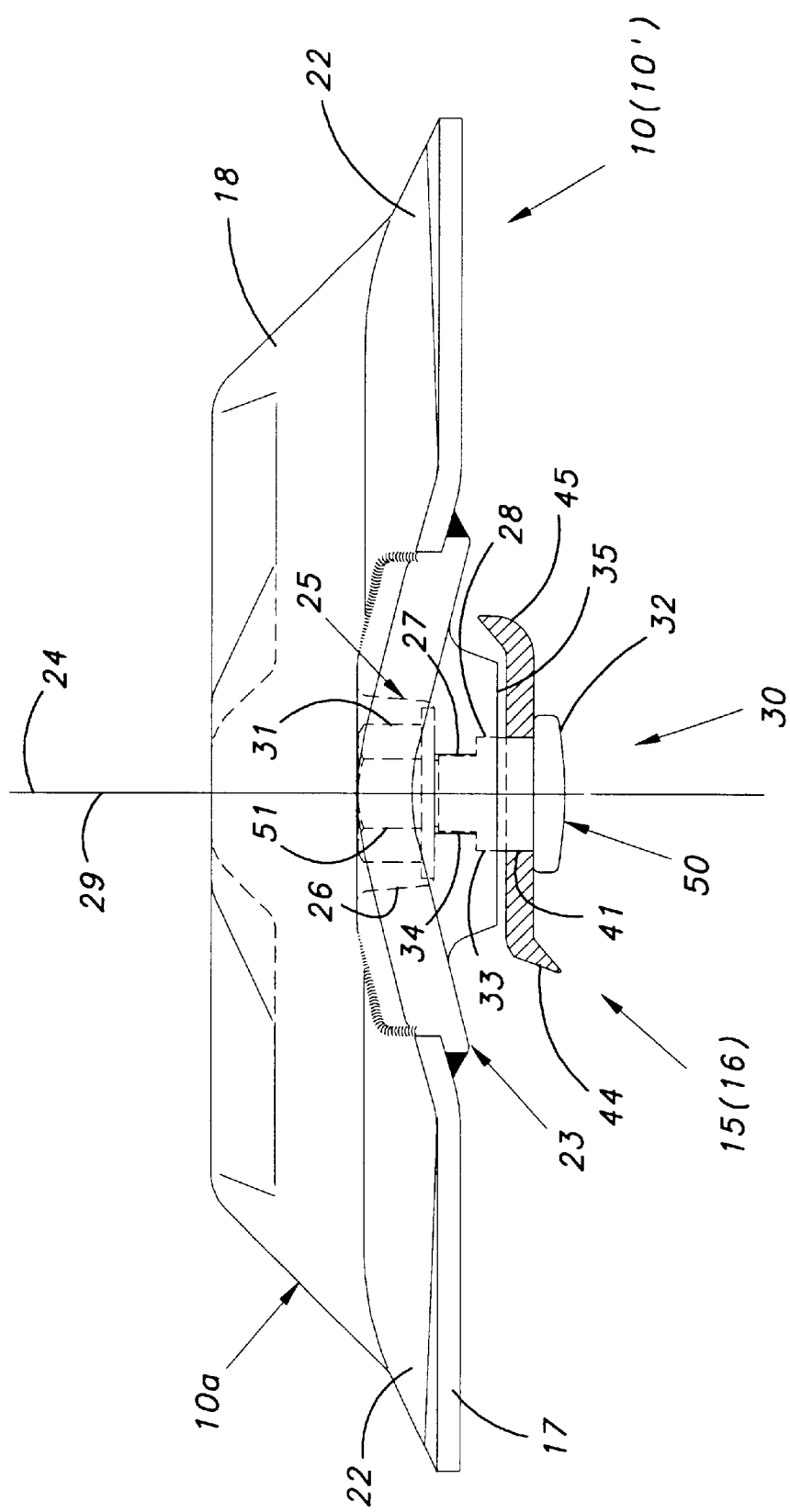

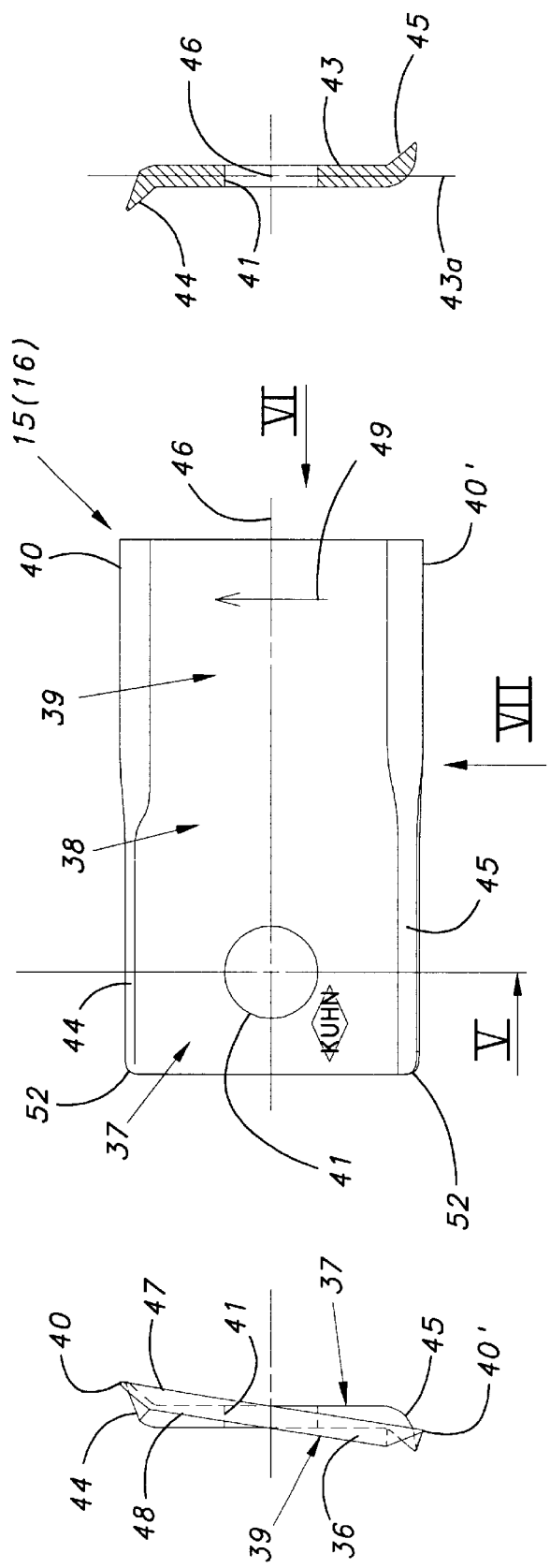

CUTTING ELEMENT FOR A ROTARY CUTTING MACHINE

BACKGROUND OF THE INVENTION

1. Field of the Invention

The present invention relates to a cutting element for a rotary cutting machine comprising a multiplicity of adjacent cutting members each of which is intended, during cutting, to rotate about an upwardly directed respective axis, said cutting element comprising:

an active zone intended to cut plants, and a connecting zone intended to connect said cutting element to a support of a respective one of said cutting members of said machine.

2. Discussion of the Background

A cutting element such as this is already known to those skilled in the art. Specifically, document WO 99/18769 describes a disk mower equipped with blades each comprising:

a substantially flat first end with a hole for pivotally connecting said blade to a shaft formed at the periphery of the respective disk of the mower, an also substantially flat second end equipped with two cutting edges, and a connecting zone connecting the first end and the second end, the first end and the second end lying in respective planes which are substantially parallel and offset one with respect to the other.

One of the specific features of this known blade lies in the fact that the connecting zone has a substantially chevron-shaped profile, the purpose of which is to increase the bending strength of said blade.

Those skilled in the art know, from experience, that the wear on a cutting element during work causes the cutting edge to shift gradually toward the vertical mid-plane of said cutting element. On this known blade, said gradual shift means that the part of the cutting edge located in the connecting zone moves back up along the slope of the chevron. The part of the cutting edge located at the second end for its part remains in a plane substantially parallel to the ground. In consequence, as soon as wear begins, the cutting height along one and the same blade no longer remains uniform, which results in a quality of work which very quickly deteriorates.

SUMMARY OF THE INVENTION

The object of the present invention is to overcome this drawback while allowing the cutting element to retain increased bending strength.

To this end, the cutting element of the present invention which comprises:

a first zone known as the active zone which extends at one end of said cutting element and which is intended to cut plants, and a second zone known as the connecting zone which extends at the other end of said cutting element and which is intended to connect said cutting element to the support of the respective cutting member, wherein the connecting zone has, in cross section:

a relatively flat central part, a first edge inclined toward one side of a plane of extension of said central part, and a second edge inclined toward the other side of said plane of extension.

This profile with inclined edges gives the cutting element remarkable bending stiffness. The active zone, which is relatively flat, contains the entirety of the cutting edge(s). In spite of the inevitable progression of wear, the cutting height remains substantially uniform across the entire length of the cutting element.

BRIEF DESCRIPTION OF THE DRAWINGS

Other features of the invention which are to be considered in isolation or in any possible combination will become apparent from the subclaims and from the following description of one nonlimiting exemplary embodiment of the invention which is depicted in the appended drawings in which:

FIG. 3 depicts, in a view in the direction of arrow III, the cutting member of FIG. 2, in partial section, FIGS. 4 to 7 depict various views of a cutting element according to the invention fitted to the cutting member of FIGS. 2 and 3.

DESCRIPTION OF THE PREFERRED EMBODIMENT

Figure 1:
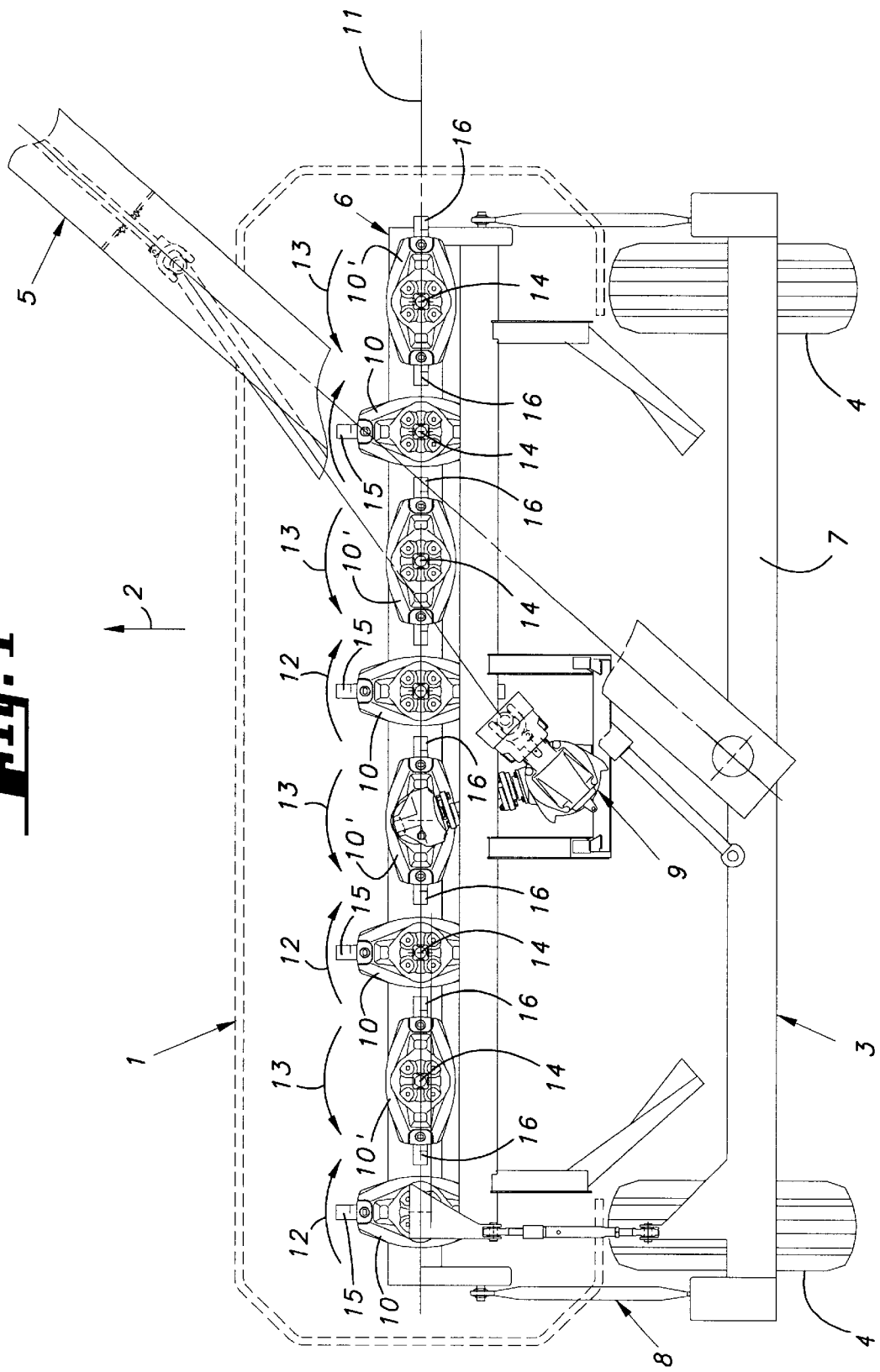
FIG. 1 depicts, in a top view with partial sections, a rotary cutting machine according to the invention in a work position.

FIG. 1 shows a rotary cutting machine produced in the form of a disk mower 1. Said mower 1 is coupled to a tractor vehicle, not depicted, which, during use, pulls it along in a direction of forward travel 2.

Said disk mower 1 comprises a body 3 rolling along a ground by means of two wheels 4 and a drawbar 5 connecting said body 3 to said tractor vehicle. The body 3 comprises a cutting mechanism 6 which may or may not be equipped with a mechanism for treating the cut product, and a chassis 7. Said chassis 7 in the known way provides a connection between said drawbar 5 and the cutting mechanism 6. Said cutting mechanism 6 is connected to said chassis 7 by means of a suspension system 8 which allows the cutting mechanism 6 to move mainly upward, downward and in roll with respect to said chassis 7 so as to follow the unevennesses of the ground independently of said chassis 7. This disk mower 1 also comprises transmission elements 9 which, in the known way, drive the cutting mechanism 6 from a power take-off of the tractor vehicle. For further details, those skilled in the art may refer to document FR 2 759 531 where such a disk mower 1 is perfectly described.

Said cutting mechanism 6 which, during work, rests at least partially on the ground, comprises several cutting members 10, 10'. In the exemplary disk mower 1 of FIG. 1, said cutting mechanism 6 comprises eight cutting members 10, 10' arranged at substantially regular intervals in a direction 11 which, during work, is substantially perpendicular to the direction of forward travel 2. Said cutting members 10, 10' are driven with a rotational movement 12, 13 about an upwardly directed respective axis 14. In this example of a disk mower 1, two consecutive cutting members 10, 10' have different respective directions of rotation 12, 13. Specifically, if reference is made to FIG. 1, a first cutting member 10 from the left rotates in a clockwise direction 12 when viewed from above, while a cutting member 10' immediately next to it rotates in a counterclockwise direction 13. It would, however, within the context of the present invention, be very easy to conceive of cutting machines with different distributions of the direction of rotation 12, 13 between the various cutting members 10, 10'. Each cutting member 10, 10' is equipped with at least one cutting element 15, 16 whose main purpose is to cut plant matter. In the example of FIG. 1, the cutting members 10, 10' are each equipped with two cutting elements 15, 16. However, this number is nonlimiting and could perfectly well be higher than two.

Figure 2:
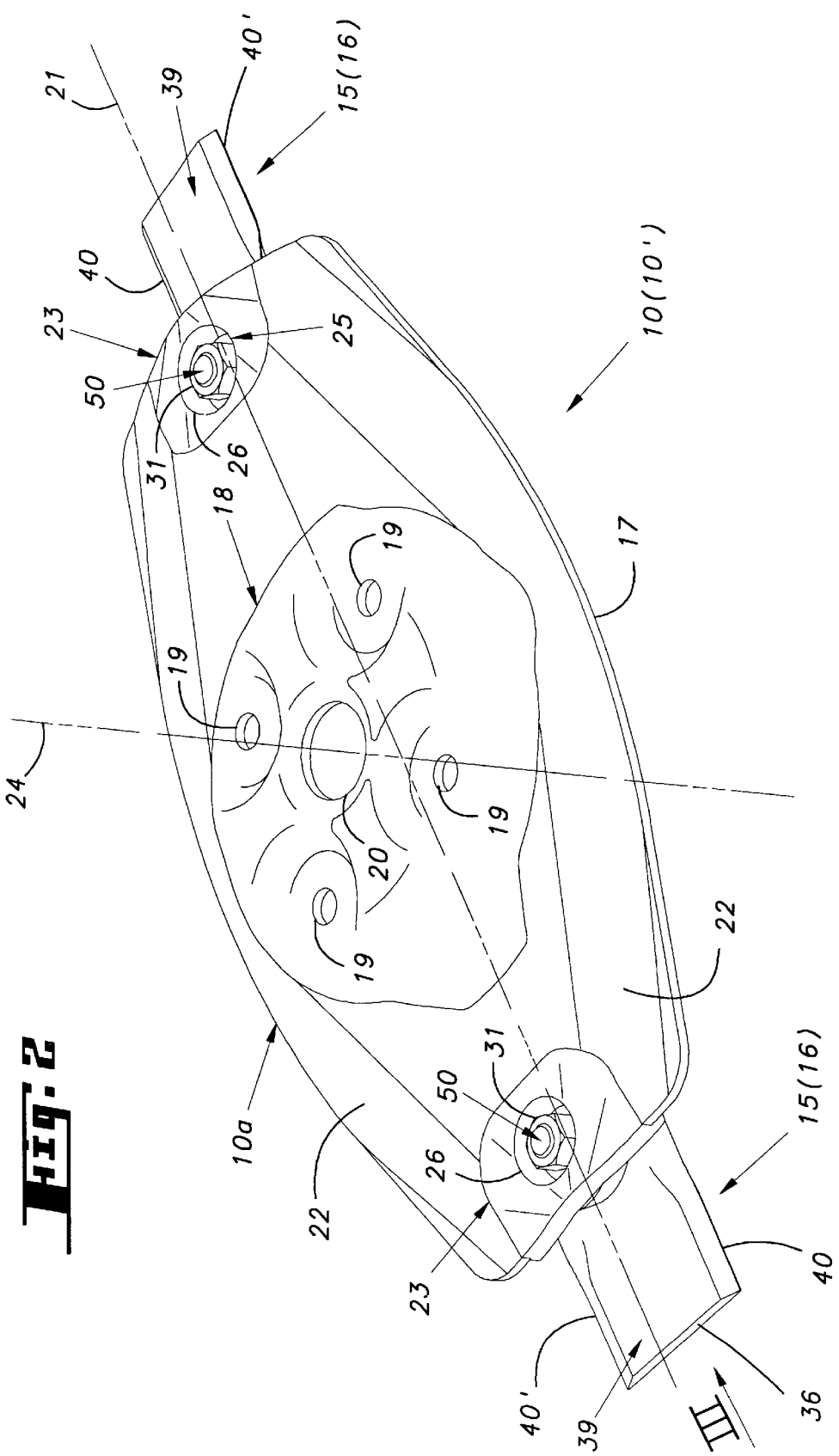
FIG. 2 depicts, in perspective, one exemplary embodiment of a cutting member equipped with two cutting elements according to the invention.

FIG. 2 shows, in perspective and in further detail, one example of a cutting member 10, 10' equipped with two cutting elements 15, 16.

The cutting member 10, 10' in FIG. 2 comprises, in the known way, a support 10a with an oval shape 17 with a raised cone frustum-shaped central part 18 an upper face of which has four fixing holes 19 and one centring hole 20. The way in which such a cutting member 10, 10' is connected to the cutting mechanism 6 of a disk mower is perfectly known to those skilled in the art. A respective cutting element 15, 16 is connected near to each end of a large diameter 21 of the support 10a, which support 10a for this purpose has a respective dished part 23. Said support 10a is slightly curved so that it has a slope 22 on each side of said large diameter 21. The cutting member 10, 10' of FIG. 2 at least substantially observes an axis of symmetry 24 which, during work, is coincident with the axis of rotation 14 of said cutting member 10, 10' by virtue of the centring hole 20. As a rotational frequency of said cutting members 10, 10' is high on this type of cutting machine, a precaution such as this is necessary in order to avoid excessive imbalance which would be detrimental to the mechanical integrity of the cutting mechanism 6 as a whole.

For further details on this exemplary cutting member 10, 10', those skilled in the art may refer to document FR 2 774 853.

FIG. 3 shows a view of the cutting member 10, 10' of FIG. 2 in a direction of arrow III (the direction of the large diameter 21) defined in FIG. 2, the cutting element 15, 16 being shown in section.

Each dished part 23 which, in this example, is welded to the support 10a, has a hole 25. Said hole 25 comprises a substantially cylindrical or slightly frustoconical upper section 26, an oblong intermediate section 27 and a cylindrical lower section 28. These various sections 26–28 are concentric, with their axis 29 substantially parallel to the axis of symmetry 24 of the cutting member 10, 10'.

Said cutting element 15, 16 is connected to the respective dished part 23 by means of a connecting element 30 which, in this example, is made up of a screw 50 and of a nut 31. Said connecting element 30 forms, between the cutting element 15, 16 and the support 10a, an articulation, an axis 29 of which is, during work, directed upward. This degree of freedom allows said cutting element 15, 16 to extend, under an action of centrifugal force due to the frequency of rotation of the cutting member 10, 10', radially in a direction of the large diameter 21 and to move aside in the event of impact with an obstacle during work. Said screw 50 comprises, from the bottom upward (FIG. 3), a head 32, a cylindrical section 33, an oblong section 34 and finally a threaded portion 51 onto which the nut 31 is screwed. Said cylindrical section 33 both guides the cutting element 15, 16 and centers said screw 50 in the lower section 28 of the hole 25. The oblong sections 27, 34, respectively of the dished part 23 and of the screw 50, prevent said screw 50 from rotating with respect to said dished part 23. Thus, the operations of tightening and loosening the nut 31 of said screw 50 can be done with just one tool. It may also be noted that, in the exemplary embodiment of FIG. 3, said nut 31 is completely embedded in the upper section 26 of the hole 25 of the dished part 23 so that it can be protected against rapid wear due, in particular, to repeated contact with the cut product. The cutting element 15, 16 is stopped from translational movement in a direction of the axis 29, downward, by the head 32 of the screw 50 and is stopped from translational movement, upward, by an underside 35 of the dished part 23. Note that the dimensions of the various sections of the screw 50 and of the hole 25 mean that the distance between the head 32 of the screw 50 and the underside 35 of the dished part 23, once the nut 31 has been tightened onto the threaded part 51 of the screw 50, is at least slightly greater than a thickness of the cutting element 15, 16, which guarantees that said cutting element 15, 16 will have the possibility of pivoting unimpeded about an axis of the screw 50.

FIGS. 4 to 7 show various views of the cutting element 15, 16 according to the present invention. FIG. 4 is a plan view. Based on this, FIG. 5 is a view in section on arrow V, FIG. 6 is a view along arrow VI and FIG. 7 is a view along arrow VII.

In this embodiment, said cutting element 15, 16 is made from a flat section piece of trapezoidal cross section 36 comprising a large base 47 and a small base 48. After shaping, said cutting element 15, 16 has three distinct zones: a connecting zone 37, an active zone 39 and an intermediate zone 38 which makes the join between the two aforementioned zones 37, 39.

The trapezoidal cross section 36 allows said active zone 39 to have two tapered cutting edges 40, 40' without the need to resort to additional shaping operations. The connecting zone 37 comprises, on one hand, a substantially flat central portion 43 equipped with a hole 41 allowing the passage of the screw 50 and, on another hand, in this example, two edges 44, 45 which are inclined with respect to said central portion 43. In fact, said central portion 43 has a plane of extension 43a, and an edge 44 is inclined toward one side of this plane of extension 43a, while another edge 45 is inclined toward another side of said plane of extension 43a. Each of said edges 44, 45 is thus bent in a different direction so that the connecting zone 37 substantially observes axial symmetry about a longitudinal axis 46 of the cutting element 15, 16. Observance of said symmetry of axis 46 allows the cutting element 15, 16 to be connected to the respective cutting member 10, 10' with the large base 47 of the trapezoidal section 36 facing either downward or upward, thus offering the user the possibility of making best use of said cutting element 15, 16. A height of the inclined edges 44, 45 of the connecting zone 37 is advantageously determined so that at least one of said inclined edges 44, 45 protects the head 32 of the respective screw 50 against any knocks during work.

In the example of the cutting element 15, 16 depicted in FIGS. 4 to 7, the active zone 39 is inclined with respect to the connecting zone 37 by a slight rotation of one with respect to the other about the axis of symmetry 46 of the connecting zone 37. This inclination, which is such that an active cutting edge 40 is closer to the ground on which the mower 1 is operating than is an inactive cutting edge 40', has the objective, during work, of creating a phenomenon of lifting the cut product so that said cut product is carried away by the cutting members 10, 10' in an opposite direction to the direction of forward travel 2. The existence of two directions of rotation 12, 13 of the cutting members 10, 10' entails the existence of cutting elements 15, 16 which have different directions of inclination of the active zone 39 with respect to the connecting zone 37. This accounts for the difference between the cutting elements 15 equipping the cutting members 10 rotating in the clockwise direction 12 and the cutting elements 16 equipping the cutting members 10' rotating in the counterclockwise direction 13. To make it easier to distinguish between these two types of cutting element 15, 16 during mounting operations, these have a specific marking 49. In the example of FIGS. 4 to 7, the distinction is simplified by an arrow 49 impressed into the large base 47 and into the small base 48 of the active zone 39 at the time of shaping. Said arrow 49 indicates the direction of rotation 12, 13 that the cutting member 10, 10' to which said cutting element 15, 16 is connected is to have.

The intermediate zone 38 ensures gradual transition between the connecting zone 37 and the active zone 39. Each inclined edge 44, 45 of the connecting zone 37 continues as far as the intermediate zone 38 to terminate at a cutting edge 40, 40' of the active zone 39. Said inclined edges 44, 45 are oriented in the same direction as the direction of inclination of the active zone 39 with respect to the connecting zone 37 so as to reduce the deformation of the intermediate zone 38 during shaping of the cutting element 15, 16. Excessive deformation of said intermediate zone 38 could actually give rise to cracks detrimental to the mechanical integrity of said cutting element 15, 16.

Said bent edges 44, 45 advantageously comprise, on the opposite side to the intermediate zone 38, a rounded angle 52 so as to limit the risk of catching on the cut product, as this would be detrimental to the quality of the work done by the disk mower 1.

The cutting element 15, 16 and the disk mower 1 which have just been described are merely one exemplary embodiment and exemplary use which cannot in any way restrict the field of protection defined by the following claims.

What is claimed as new and desired to be secured by Letters Patent of the United States is:

1. Cutting element for a rotary cutting machine comprising a multiplicity of adjacent cutting members each of which is intended, during cutting, to rotate about an upwardly directed respective axis, said cutting element comprising an active zone intended to cut plants and a connecting zone intended to connect said cutting element to a support of a respective one of said cutting members, wherein said connecting zone has, in cross section:

a relatively flat central part, a first edge inclined toward one side of a plane of extension of said central part, and a second edge inclined toward another side of said plane of extension.

2. Cutting element as claimed in claim 1, wherein said active zone is inclined with respect to said connecting zone about a longitudinal axis of said cutting element, an intermediate zone making a join between said active zone and said connecting zone.

3. Cutting element as claimed in claim 2, wherein said inclined edges of the connecting zone continue as far as said intermediate zone.

4. Cutting element as claimed in claim 2, wherein an orientation of said inclined edges of the connecting zone follows a direction of the inclination of said active zone with respect to said connecting zone.

5. Cutting element as claimed in claim 2, wherein said active zone comprises two cutting edges and the inclination of said active zone with respect to said connecting zone is such that an active cutting edge of said cutting element is, during cutting, closer to a ground over which the cutting machine is travelling than an inactive cutting edge of said cutting element.

6. Cutting element as claimed in claim 2, wherein said inclined edges of the connecting zone have a rounded angle on an opposite side to the intermediate zone.

7. Cutting element as claimed in claim 1, wherein said connecting zone comprises, in said central part, a hole allowing the passage of a connecting element intended to connect said cutting element to said support of the respective cutting member.

8. Cutting element as claimed in claim 7, wherein said connecting element connects said cutting element to said support of the respective cutting member in an articulated manner.

9. Cutting element as claimed in claim 7, wherein a height of said inclined edges of the connecting zone is determined so that at least one of said inclined edges protects said connecting element during work.

10. Cutting element as claimed in claim 1, wherein said cutting element is made from a flat section piece of trapezoidal cross section.

11. Rotary cutting machine comprising several adjacent cutting members each of which is intended, during cutting, to rotate about the upwardly directed respective axis and each adjacent cutting member comprises the support and at least one cutting element, wherein said cutting element is the cutting element as claimed in any one of claims 1 to 10.

12. Rotary cutting machine as claimed in claim 11, and which is a mower, in which said supports for the cutting members each comprise a disk.

13. A cutting element for a rotary cutting machine including a cutting member configured to rotate about an upwardly directed axis, said cutting element comprising:

an active portion having a cutting edge; and a connecting portion connected to said active portion and configured to connect said cutting element to a support of the cutting member, wherein said connecting portion has a cross section, at a position where said cutting element is connected to said support, that includes a generally flat central part, a first edge inclined toward one side of a plane of extension of said central part, and a second edge inclined toward another side of said plane of extension.

14. A cutting element for a rotary cutting machine including a cutting member configured to rotate about an upwardly directed axis, said cutting element comprising:

a means for cutting plants; and a means for connecting said cutting element to a support of the cutting member, wherein said means for connecting has a cross section that includes a generally flat central part, a first edge inclined toward one side of a plane of extension of said central part, and a second edge inclined toward another side of said plane of extension.

* * * * *